US010130209B2

United States Patent
Stewart et al.

(10) Patent No.: US 10,130,209 B2
(45) Date of Patent: *Nov. 20, 2018

(54) BEVERAGE BREWING PRODUCT

(71) Applicants: Paul Alan Stewart, Mobile, AL (US); Adam Paul Stewart, Mobile, AL (US)

(72) Inventors: Paul Alan Stewart, Mobile, AL (US); Adam Paul Stewart, Mobile, AL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/867,288

(22) Filed: Jan. 10, 2018

(65) Prior Publication Data

US 2018/0303274 A1   Oct. 25, 2018

Related U.S. Application Data

(63) Continuation-in-part of application No. 15/671,463, filed on Aug. 8, 2017, which is a continuation-in-part of application No. 15/496,796, filed on Apr. 25, 2017, which is a continuation-in-part of application No. 15/375,881, filed on Dec. 12, 2016, now Pat. No. 9,725,232, which is a continuation-in-part of application No. 14/485,878, filed on Sep. 15, 2014, now Pat. No. 9,549,634, which is a continuation-in-part of application No. 13/965,498, filed on Aug. 13, 2013, now Pat. No. 9,468,330, (Continued)

(51) Int. Cl.
*A47J 31/40* (2006.01)
*A23F 3/18* (2006.01)
*A23F 3/14* (2006.01)
*A47J 31/06* (2006.01)
*A47J 31/00* (2006.01)

(52) U.S. Cl.
CPC ............... *A47J 31/407* (2013.01); *A23F 3/14* (2013.01); *A23F 3/18* (2013.01); *A47J 31/002* (2013.01); *A47J 31/0642* (2013.01)

(58) Field of Classification Search
CPC ... A23F 3/40; A23F 3/405; A47J 31/40; A47J 31/407; B65D 85/8043; B65D 85/804; B65D 85/8046; B65D 85/808; B65D 81/3484
See application file for complete search history.

(56) References Cited

U.S. PATENT DOCUMENTS 2,362,459 A    11/1944  Barnett
2,791,324 A     5/1957  Knoop et al.
(Continued)

OTHER PUBLICATIONS https://youtu.be/rDAtGBVW-HY

*Primary Examiner* — Erik Kashnikow
*Assistant Examiner* — Lela S. Williams
(74) *Attorney, Agent, or Firm* — Southeast IP Group, LLC.; Thomas L. Moses; Randolph J. Tucker

(57) ABSTRACT

A beverage brewing product for brewing a sweetened beverage is disclosed which produces a sweetened beverage solution that can be mixed with a diluting liquid and which comprises at least one water permeable sieve and/or a dissolvable film packet wherein beverage material and granulated sweetener are contained. The beverage material and sweetener are brewed and dissolved during steeping in hot water to produce a sweetened beverage solution. The beverage solution, if concentrated, is then mixed with a proportioned amount of diluting liquid to make a consistently sweet beverage. This beverage brewing product may be used to produce a variety of consistently sweetened beverages, including tea, coffee, lemonade, and other sweetened beverages.

17 Claims, 9 Drawing Sheets

Related U.S. Application Data which is a continuation-in-part of application No. 13/867,526, filed on Apr. 22, 2013, now Pat. No. 9,468,222.

(56) References Cited

U.S. PATENT DOCUMENTS

| | | |
|---|---|---|
| 2,791,505 A | 5/1957 | Barnett |
| 3,186,850 A | 6/1965 | Anthony |
| 3,809,215 A | 5/1974 | Debry |
| 4,853,234 A | 8/1989 | Bentley et al. |
| 2005/0247207 A1 | 11/2005 | Saint |
| 2008/0171110 A1 | 7/2008 | Stuart |
| 2010/0159076 A1 | 6/2010 | Puliyev |

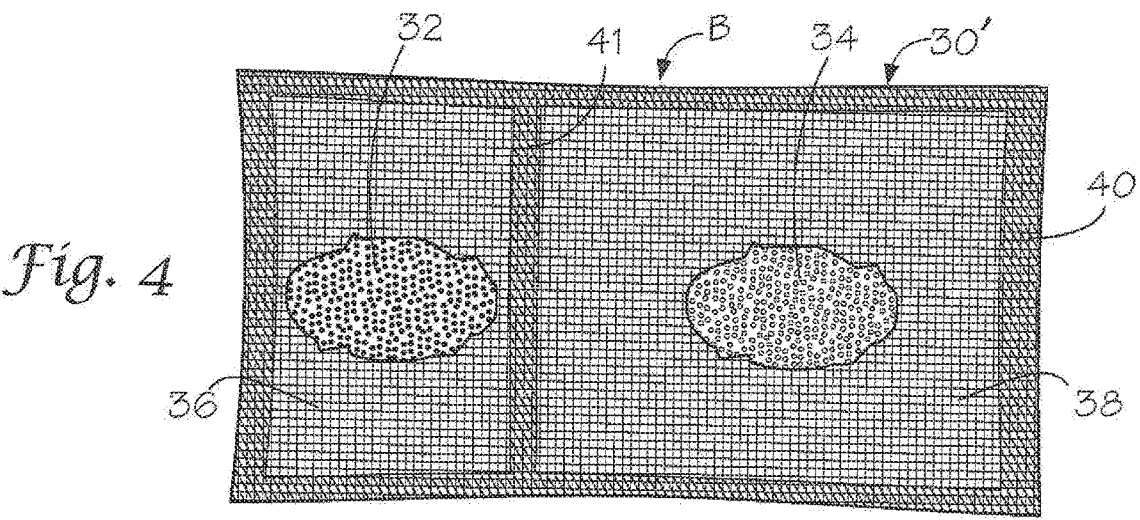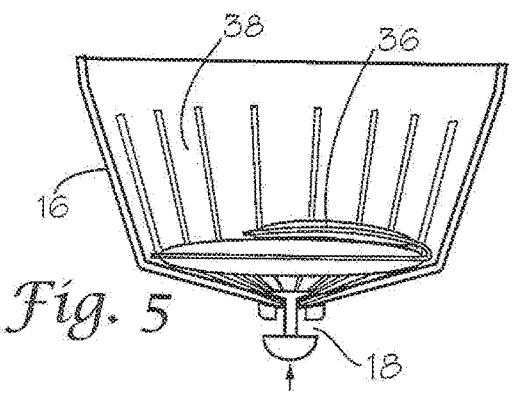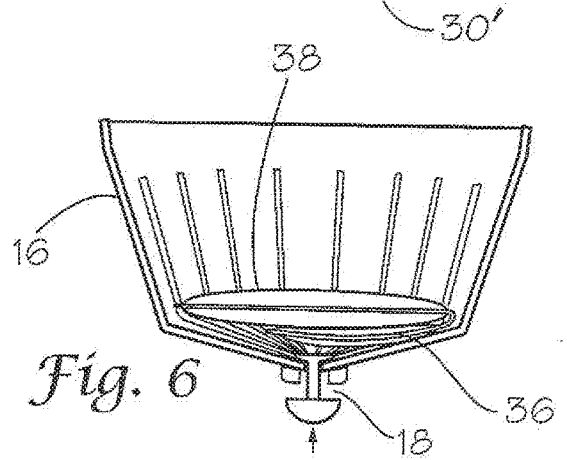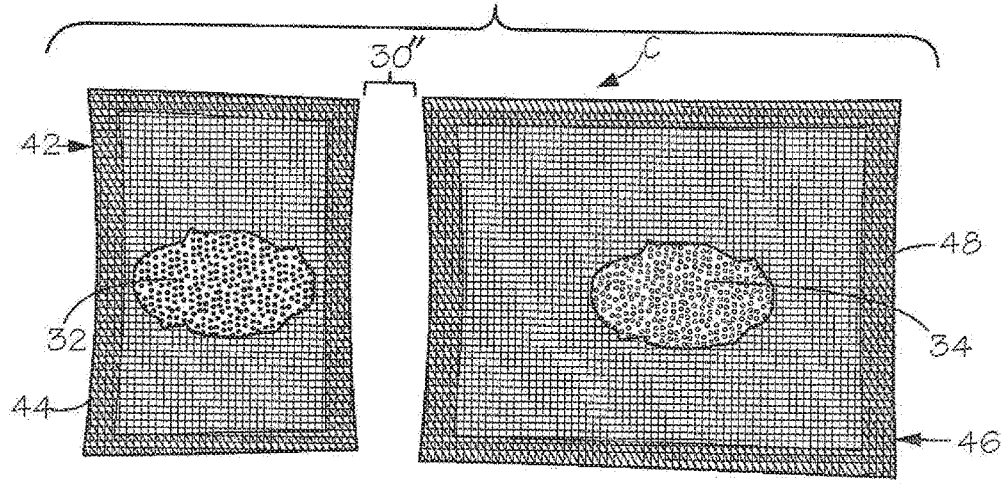

BEVERAGE BREWING PRODUCT

CROSS-REFERENCE TO RELATED APPLICATIONS

The present application is a continuation-in-part of U.S. application Ser. No. 15/671,463, entitled BEVERAGE BREWING PRODUCT, filed on Aug. 8, 2017, which is a continuation-in-part of U.S. application Ser. No. 15/496,796, entitled BEVERAGE BREWING PRODUCT, filed on Apr. 25, 2017, which is a continuation-in-part of U.S. application Ser. No. 15/375,881, entitled BEVERAGE BREWING PRODUCT, filed on Dec. 12, 2016, which is a continuation-in-part of U.S. application Ser. No. 14/485,878, entitled DOMESTIC SWEET TEA BREWING PRODUCT AND PROCESS, filed on Sep. 15, 2014, which is a continuation-in-part of U.S. application Ser. No. 13/965,498, entitled DOMESTIC SWEET TEA BREWING PRODUCT AND PROCESS, filed on Aug. 13, 2013, which is also a continuation-in-part of U.S. application Ser. No. 13/867,526, entitled TEA BREWING AND SWEETENING PRODUCT AND PROCESS, filed on Apr. 22, 2013. All of the foregoing applications are hereby incorporated by reference in their entireties.

TECHNICAL FIELD

The invention relates to the consistent brewing of sweetened beverages and particularly to the provision of a beverage material and sweetener product for brewing.

BACKGROUND OF THE INVENTION

When brewing sweetened beverages, such as sweet tea, in restaurants and in the home, there is a lack of consistency from one batch of beverages to the next. For example in tea brewing, the industry uses standard sugar to sweeten tea, and the industry standard is basically one pound of sugar per gallon of tea, which gives a brix of about 11. Brix is a measure (degree) of the sugar content of an aqueous solution. One degree Brix is one gram of sucrose in 100 grams of solution and represents the strength of the solution as a percentage by weight (% w/w). If the solution contains dissolved solids other than pure sucrose, then the Brix only approximates the dissolved solid content. The Brix is traditionally used in tea, wine, sugar, fruit juice, and honey industries to measure sweetness. Brewed sweetened tea has a typical Brix level of 10 to 11. The problem is one usually does not have a scale to weigh out one pound of sugar per gallon of tea so the Brix level varies from one pot or urn of tea to the next. Similarly, this lack of consistency can be a problem when preparing other sweetened beverages as well.

Also in particular to brewing tea, a commercial tea brewing urn typically holds at least 3 gallons of tea and has a brewing basket. A paper filter is placed in the basket and then filled with the tea. Hot water flows into the brewing basket to steep the tea in the basket, and concentrated tea solution is passed into the urn. At the same time, cold water is being delivered into the urn, and the concentrated tea solution and cold water are mixed to make tea. However, when the sugar is added, the temperature of the tea is much cooler often meaning the added sugar is not totally dissolved. Domestic tea machines used in the home, and some restaurants, typically are like drip coffee machines. In domestic brewing the same products and techniques are used, that is, tea is brewed to produce a tea concentrate, then water is added to dilute the tea concentrate, and then the tea solution is sweetened with sugar. For example, there are two typical methods for brewing tea domestically, and each method is made with one teabag to make one quart of brewed tea solution. In the first method, 2 cups of water is brought to a boil on the stove. The boiling water is poured into a tea pitcher on top of one teabag and allowed to steep for 3 to 5 minutes. After steeping, the teabag is removed from the tea solution, and sufficient sugar is added to sweeten the tea to a desired taste profile, that is, a quarter pound or less, and in some instances more. Once sweetened, two additional cups of water are added to the tea pitcher to dilute the sweet tea concentrate. In a second method, a quarter ounce teabag is placed in the brew basket of a domestic tea/coffee maker. Then, 2 cups of water are poured into the tea/coffee maker. The tea/coffee maker will then dispense hot water over the teabag to brew a tea concentrate delivered into a container or urn, like a coffee pot. The tea concentrate is then poured into a tea pitcher and sweetened to a desired level. Once sweetened, 2 cups of water are poured into the pitcher to dilute the sweet tea concentrate. The preparation of coffee occurs by a similar method, although the addition of sugar and other flavor additives generally occurs on an individual cup by cup basis. However, these methods do not provide an effective way to brew sweetened beverages, like coffee or tea, in a consistent and accurate manner.

The commercial tea brewer most commonly used today was invented nearly 40 years ago and has remained relatively unchanged since then. Likewise, the drip brewing method commonly utilized in coffee preparation was invented more than 60 years ago. Therefore, it would be desirable to provide an improved method and apparatus for brewing sweetened beverages, such as tea and coffee.

Various attempts have been made to improve the brewing of sweetened beverages. US Published Application No. 2010/0159076 A1 shows a floatable infusion package that may include tea and sugar in separate compartments. US Published Application No. 2008/0171110 A1 shows a foraminous plastic vertical tube that can contain tea and sugar, or other solids, which is rigid enough to grip and stir in a liquid to dissolve or infuse its contents. U.S. Pat. No. 2,362,459 discloses an infusion package and the manufacture thereof that includes compartments A and B wherein one compartment contains tea and the other compartment contains sugar. US Published Application No. 2005/0247207 A1 shows a drink infusion device, including tea, having a submersible element and a buoyant retrievable element. U.S. Pat. No. 3,809,215 shows a floating infusion package for tea. U.S. Pat. No. 2,791,505 shows an infusion package having one compartment filled with tea and another compartment filled with sugar. Other patents show various other means of packaging tea and/or sugar. U.S. Pat. No. 2,791,324 discloses a compartmented package that may include tea in one compartment, sugar in another, and creamer in another compartment, which may be poured into a cup of hot water. U.S. Pat. No. 3,186,850 discloses an infusion package containing beverage ingredients, such as powdered tea and sugar carried by a cup, wherein the ingredients are poured into the cup containing hot water. U.S. Pat. No. 4,853,234 discloses a rigid beverage package that can contain any desired beverage ingredients. Each of the references mentioned above are hereby incorporated herein, in their entirety, by reference. However, none of the prior efforts have provided a way to make sweetened tea accurately and consistently. Additionally, none of the prior efforts have provided a way to make other sweetened beverages accurately and consistently.

Accordingly, an object of the invention is to provide an accurate and consistent way of brewing sweetened beverages, including tea and coffee.

Another object of the invention is to provide a beverage brewing product for use in a drip tea/coffee machine which provides an accurate and consistent way of brewing sweetened beverages.

Another object of the present invention is to provide sources of beverage materials and granulated sweetener particles which can be brewed together in a brewing basket to form a concentrated sweetened beverage solution that exits the brewing basket with sugar dissolved.

Another object of the invention is to provide a filtering means containing beverage materials and sweetener for use in the brewing basket of a drip tea/coffee machine to brew beverages accurately and consistently.

Another object of the present invention is to provide a sweetened beverage product whereby one may pull a brew basket out of the tea/coffee maker and place therein one or more pouches containing beverage materials and sweetener, and push a start button to brew sweetened beverages consistently, time and time again.

SUMMARY OF THE INVENTION

The above objectives are accomplished according to the present invention by providing a brewing system for brewing beverages comprising a brewing machine having a brewing basket and a brewing pot or urn. The brewing basket may contain one compartment, as normal, may be modified to include multiple compartments, or may include multiple separate single compartment funnels.

A known source of beverage materials and granulated sweetener is provided for placement into the brewing basket during brewing. One or both of the beverage materials and granulated sweetener may be contained by a water permeable sieve having a sieve size for retaining such. The sieve may be a mesh pouch, an open filter, or any other suitable filtering device. Alternatively, or in addition, one or both of the beverage materials and granulated sweetener may be contained within a packet made of a food-grade dissolvable film which dissolves after contact with water. It is also preferred that such film doesn't significantly impact the taste or composition of the final beverage.

The beverage materials used in the present product may include tea, coffee, or a flavored concentrate—a compound of one or more flavoring agents—and may be solid, liquid, or gelatinous in form. For example, the beverage materials may be a liquid flavored concentrate (like a tea, coffee, or lemonade concentrate) contained within a dissolvable film packet or cured tea leaves simply contained within a sieve—like a traditional tea bag. Flavored concentrate may be one or a mix of many flavoring agents to produce flavors including—but not limited to—lemonade, limeade, pink lemonade, peach, mango, raspberry, lemon, fruit punch, tea, coffee, apple cider, hot chocolate, and the like.

The granulated sweetener used by the present product may include, traditional sugar or that produced from agave, coconut, honey, maple syrup, molasses, stevia, or sugar alcohols. The brewing machine includes a hot water dispenser for dispensing hot water into the brewing basket to steep the beverage materials and granulated sweetener in hot water in the basket, dissolving the sweetener, and extracting the flavor from the beverage materials in the brewing basket or sieve to produce a sweetened beverage solution. The sweetened beverage solution, if concentrated, may be diluted by being added to water or other desired liquid. In this manner, the beverage is already effectively sweetened before it is diluted. The diluting liquid may be in the same container the sweetened beverage solution is delivered to, or a separate container to be combined with the sweetened beverage solution. In a further embodiment involving beverage material which can dissolve, the sieve and/or the dissolvable film packet containing the beverage material and granulated sweetener may be placed directly into a container—such as a pitcher, pot, urn, or cup—before or after water is dispensed therein to produce a sweetened beverage solution.

Tea

In a preferred embodiment, the beverage material includes tea and the sweetener includes sugar which are both contained in a pouch sieve within the brew basket during steeping to produce a concentrated tea solution and, ultimately, sweetened tea, once the solution is added to water. Preferably, the blend ratio of tea to sugar is in the range of 1:3 to 1:35, even more preferably in the range of 1:5 to 1:25, and the sources of tea particles and granulated sugar particles are retained in one of a thermoplastic or cotton mesh pouch and blended together in a prescribed blend ratio. The pouch may be a single pouch or include a first compartment for the tea particles and a second compartment for the granulated sugar. The first and second compartments may be joined together at a fold line so one of the compartments folds over the other compartment in the brewing basket. Alternatively, the tea and sugar may be contained in two separate pouches whereby one pouch sits atop or aside the other pouch in the brewing basket.

In another embodiment, it is contemplated that a mesh or paper filter having an open top and fitting inside the brewing basket may be used as the sieve. In this particular embodiment, the filter would resemble that of a traditional coffee filter whereby the tea and sugar would be placed into the filter for an open brewing process. Additionally, it is contemplated that the open filter may be used in conjunction with a mesh pouch, each containing one or more of the tea particles and granulated sugar and where the pouch may sit atop, aside, or underneath the open filter in the brewing basket.

In a further embodiment, it is contemplated that a dissolvable film packet may be utilized to contain one or both of the granulated sugar and tea. This packet may be utilized in place of or addition to the pouch/open filter described above. For example, a mesh pouch to be placed into the brew basket may contain tea and a dissolvable film packet with sugar therein or may only contain tea and a dissolvable film packet with sugar may be placed separately into the brew basket therewith. In a further example, a mesh pouch to be placed into the brew basket may contain a dissolvable film packet with both tea and sugar therein. Thereby, a dissolvable film packet may be utilized to seal out air from one or both of the tea and sugar to reduce spoliation. In use, water dispensed into the brewing basket dissolves the packet, releasing its contents, so the sugar and tea may sweeten and flavor the water to produce a sweetened and generally concentrated beverage solution. However, if the dissolvable film packet is disposed within the pouch, the product may be utilized in any container with water, not just a brewing basket, to create a beverage solution therein. Also, in certain circumstances, it may be feasible to have both the tea and sugar within the dissolvable packet, without any sieve. For example, if the brewing basket has a built-in screen to prevent loose tea from exiting the basket with the beverage solution or a user had other means for removal of loose tea remaining in the beverage solution, both sugar and tea could be contained within the dissolvable film packet without a sieve.

Preferably, the size of the granulated sugar particles used is in the range of U.S. mesh sieve nos. 3-35; although, particles the size of U.S. mesh sieve nos. 3 or larger will work successfully in the present invention. Granulated sugar particles may comprise a single granule of sugar or multiple agglomerated granules, such as in a sugar cube or sugar pellets. Alternatively, sugar blends consisting of sugar blended with high intensity sweeteners, or any other suitable granulated sweetener may be used. It is also contemplated that other beverage materials, particularly flavored concentrates, may be added to tea product prior to brewing. These concentrate flavors may include popular tea flavors such as peach, mango, raspberry, lemon, lemonade, or any other desired flavor.

A method of formulating sugar particles in the above-referenced size range is also described and disclosed herein. The sugar particles produced by the described method may be used for tea, lemonade, coffee, flavored concentrate, or any other beverage that can be steeped/brewed and sweetened. An additional method of producing an agglomerated blended product of tea and sugar particles within the above-referenced size range is also described and disclosed herein. The blend product produced by the described method may include sugar particles comprising a single granule of sugar or multiple agglomerated granules, such as in a sugar cube or sugar pellets. Further, the blend produced by the described method may include tea, coffee, or a flavored concentrate.

A method of brewing sweetened tea comprises providing a tea brewing machine having a container, such as a pitcher, pot, urn, or cup, a brewing basket carried above the container, and a hot water dispenser for delivering hot water into the brewing basket. At least one pouch, filter, or dissolvable film packet containing tea particles and sugar granules is placed into the brewing basket. Hot water is dispensed into the brewing basket for steeping the tea particles and granulated sugar to produce a flow of hot concentrated sweet tea solution from the brewing basket. In the hot concentrated sweet tea solution, the sugar is generally totally dissolved in the solution with the tea. The hot concentrated sweet tea solution is diluted with water which may be in the same or a separate container.

Coffee

In an alternative embodiment, the same brewing products and methods may be used to brew coffee, i.e. where the beverage material includes coffee. In a particular embodiment, at least one water permeable sieve or filtering device contains the sources of coffee grounds and granulated sugar having a sieve size for retaining the grounds and granulated sugar. The sieve may be a mesh pouch, an open filter, or any other suitable filtering device. Additionally, it is contemplated that the sieve may be an open filter used in conjunction with a mesh pouch, each containing one or more of the coffee grounds and granulated sugar and where the pouch may sit atop, aside, or underneath the open filter in the brewing basket. Furthermore, it is contemplated that, in place of or in addition to the sieve, one or both of the coffee and granulated sugar may be contained within a dissolvable film packet. Such packet may be located within the sieve or may be placed into a brewing basket separately with a sieve.

The same machine as described above may also be used, whereby hot water is dispensed into the brewing basket to steep the coffee grounds and granulated sugar therein, extracting flavor from the grounds and dissolving the sugar in the brewing basket to produce a hot sweetened coffee solution. The coffee solution may be brewed to any desired concentration and may be served hot, diluted with cream, milk, water and the like, and/or may be served over ice to make iced coffee. Typically, iced coffee is brewed as a more concentrated solution whereby the gradual melting of the ice dilutes the coffee.

The pouch may be a single pouch or include a first compartment for the coffee grounds and a second compartment for the granulated sugar. The first and second compartments may be joined together at a fold line so the coffee compartment folds over the sugar compartment in the brewing basket or is folded in the reverse. Alternatively, the coffee and sugar may be contained in two separate pouches whereby the coffee pouch sits atop, aside, or is disposed below the sugar pouch in the brewing basket. In another embodiment, it is contemplated that a mesh or paper filter having an open top and fitting inside the brewing basket may be used. In this particular embodiment, the filter would resemble that of a traditional coffee filter whereby the coffee and sugar would be placed into the filter for an open brewing process. A dissolvable film packet may be utilized so it is inside or outside the pouch or open filter, as long as it is located within the brewing basket during the brewing process. However, if the dissolvable film packet is disposed within the pouch, the product may be utilized in any container with water, not just a brewing basket, to create a beverage solution therein. Also, in certain circumstances, it may be feasible to have both the coffee and sugar within a dissolvable packet, without any sieve. For example, if the brewing basket has a built-in screen to prevent loose coffee grounds from exiting the basket with the beverage solution or has another means of removing loose coffee grounds from the beverage solution, both sugar and coffee could be contained within the dissolvable film packet without a sieve.

Alternatively, sugar blends consisting of sugar blended with high intensity sweeteners, or any other suitable granulated sweetener may be used. It is also contemplated that other beverage materials, particularly flavored concentrates, may be added to the coffee product prior to brewing. These concentrate flavors may include popular coffee flavors such as vanilla, hazelnut, caramel, amaretto, cream, chocolate, milk, or any other desired flavor.

Flavored Concentrate

In an additional embodiment, this same brewing products and methods may be used to brew other beverages, i.e. where the beverage material includes one or more flavored concentrates. A flavored concentrate is a compound of one or more flavoring agents. Flavored concentrate may be granular, powdered, liquid, or gelatinous. Also, flavored concentrate may be natural or artificial. Examples of concentrate flavors, and thereby beverage flavors, may include, but are not limited to, lemonade, limeade, pink lemonade, peach, mango, raspberry, lemon, fruit punch, tea, coffee, apple cider, hot chocolate, and the like.

In a particular embodiment, at least one water permeable sieve or filtering device contains the source of flavored concentrates and granulated sugar having a sieve size for retaining the concentrates and granulated sugar. Again, the sieve may be a mesh pouch, an open filter, or any other suitable filtering device. Additionally, it is contemplated that the sieve may be an open filter used in conjunction with a mesh pouch, each containing one or more of the concentrates and granulated sugar and where the pouch may sit atop, aside, or underneath the open filter in the brewing basket. In a further embodiment, a dissolvable film packet may be utilized with, or in place of, the water permeable sieve to contain one or both of the flavored concentrate and granulated sugar. Such a packet may be disposed within the sieve or be placed in the brewing basket separately with a sieve. For example, a mesh pouch to be placed into the brew basket may contain granulated sugar and a dissolvable film packet having liquid tea flavored concentrate therein or may only contain granulated sugar and a dissolvable film packet with flavored concentrate may be placed separately into the brew basket therewith. In a further example, a mesh pouch to be placed into the brew basket may contain a dissolvable film packet with both powdered lemonade flavored concentrate and sugar therein. Thereby, a dissolvable film packet may be utilized to seal out air from one or both of the flavored concentrate and sugar to reduce spoliation.

Also, the same machine as described above may be used in the particular embodiment, whereby hot water is dispensed into the brewing basket to steep the flavored concentrates and granulated sugar in hot water in the basket to extract flavoring and dissolve sugar in the basket and produce a hot sweetened flavored beverage solution. The beverage solution may be brewed to any desired concentration and may be served hot, diluted with water and the like, and/or may be served over ice to make an iced beverage.

Preferably, the blend ratio of flavored concentrate to sugar is in the range of 1:3 to 1:80, and the sources of beverage material and sugar granules are retained in one of a thermoplastic or cotton mesh pouch and blended together in a prescribed blend ratio. The pouch may be a single pouch or include a first compartment for the flavored concentrate and a second compartment for the granulated sugar. The first and second compartments may be joined together at a fold line so the concentrate compartment folds over the sugar compartment in the brewing basket or is folded in the reverse. Alternatively, the concentrate and sugar may be contained in two separate pouches whereby the concentrate pouch sits atop, aside, or is disposed below the sugar pouch in the brewing basket. In another embodiment, it is contemplated that a mesh or paper filter having an open top and fitting inside the brewing basket may be used. In this particular embodiment, the filter would resemble that of a traditional coffee filter whereby the concentrate and sugar would be placed into the filter for an open brewing process. A dissolvable film packet may also be utilized so it is inside or outside the pouch or open filter, as long as it is located within the brewing basket during the brewing process. However, if the dissolvable film packet is disposed within the pouch, the product may be utilized in any container with water, not just a brewing basket, to create a beverage solution therein. Also, in certain circumstances, it may be feasible to have both the flavored concentrate and sugar within the dissolvable packet, without any sieve. For example, if the flavored concentrate is a solid and the brewing basket has a built-in screen to prevent loose particles from exiting the basket with the beverage solution, both sugar and flavored concentrate could be contained within a single dissolvable film packet without a sieve. Further, if the flavored concentrate is dissolvable, both sugar and flavored concentrate could be contained within a single dissolvable film packet without a sieve and placed into any container, not just a brewing basket, before or after dispensing water therein to flavor such.

Preferably, the size of the particles of granulated sugar is in the range of U.S. mesh sieve nos. 3-35; although, particles the size of U.S. mesh sieve nos. 3 or larger will work successfully in the present invention. Granulated sugar particles may comprise a single granule of sugar or multiple agglomerated granules. Alternatively, sugar blends consisting of sugar blended with high intensity sweeteners, or any other suitable granulated sweetener may be used. It is also contemplated that other beverage materials, particularly tea particles, may be added to the flavored concentrate product prior to brewing.

DESCRIPTION OF THE DRAWINGS

The invention will be more readily understood from a reading of the following specification and by reference to the accompanying drawings forming a part thereof, wherein an example of the invention is shown and wherein:

FIG. 4 is a top plan view illustrating another embodiment of a beverage brewing product wherein a mesh pouch has two compartments for retaining the beverage material and granulated sweetener;

FIG. 5 is a side cut away illustrating one embodiment of beverage brewing product including a pouch which is folded so that the compartment containing the beverage material rests on top of the compartment containing the sweetener when placed in a brewing basket;

FIG. 6 is a side cut away illustrating one embodiment of beverage brewing product including a pouch which is folded so that the compartment containing the sweetener rests on top of the compartment containing the beverage material when placed in a brewing basket;

FIG. 7 is a top plan view illustrating another embodiment of a beverage brewing product including two separate pouches, the first pouch containing beverage material and the second pouch containing a sweetener:

DESCRIPTION OF A PREFERRED EMBODIMENT

Figure 1:
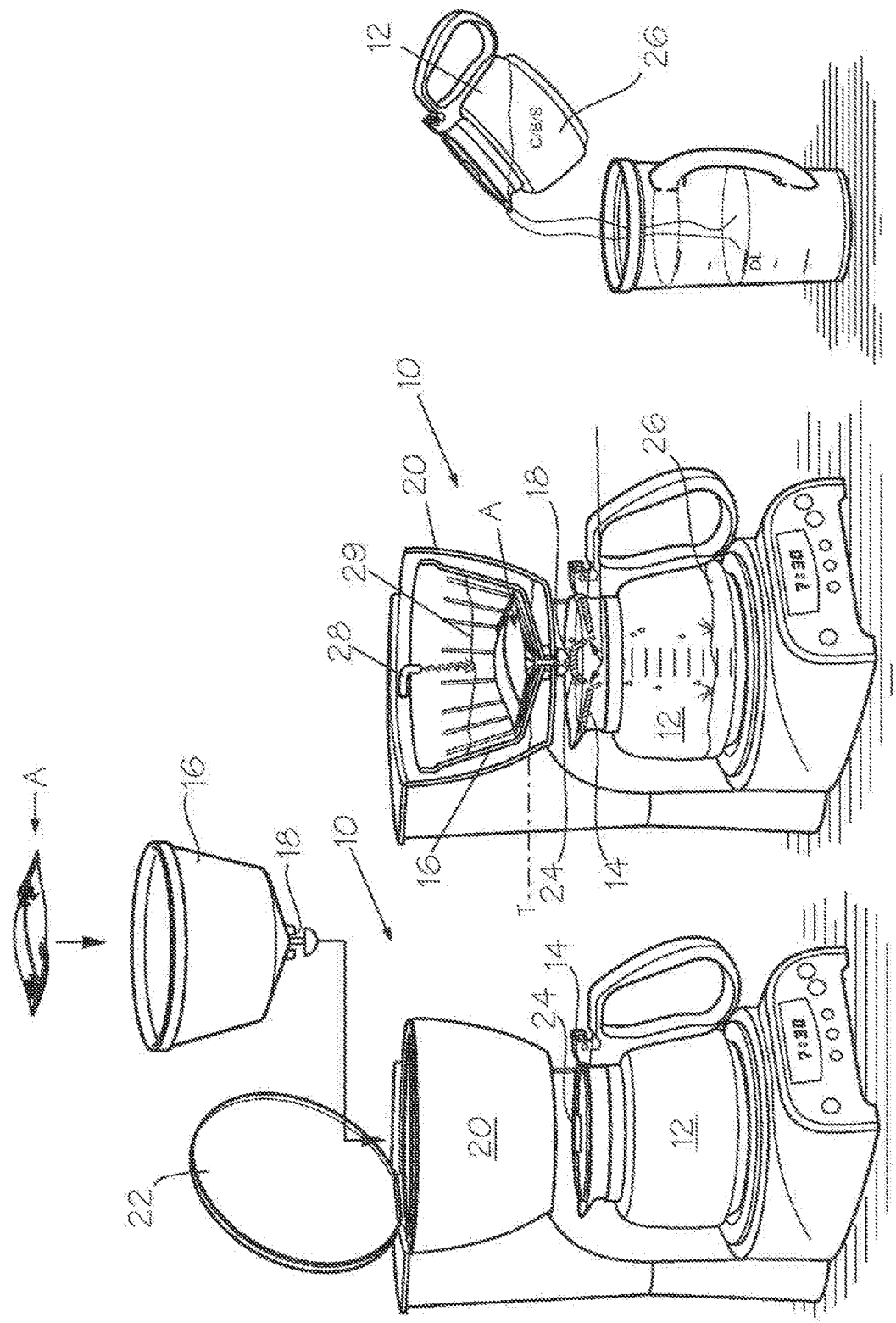
FIG. 1A is a left front perspective view with parts removed illustrating a brewing machine having a brew basket for containing beverage brewing products according to one embodiment of the invention.
FIG. 1B is a left perspective view of a brewing machine with the brewing basket inserted and enclosed and with the basket holder and brewing basket cut away to show one embodiment of the beverage brewing product being steeped therein.
FIG. 1C is a perspective view of adding a concentrated beverage solution to a proportioned amount of diluting liquid to produce a consistent sweetened beverage.

Referring now to the drawings, the invention will be described in more detail.

As can best be seen in FIG. 1, a brewing machine 10 is illustrated having a container 12, such as a pitcher, pot, urn, cup, etc., with a lid 14. A brewing basket 16 includes a basket outlet 18 through which a hot, sweetened beverage solution 26 flows during brewing. That beverage solution 26 may be concentrated or non-concentrated. A concentrated beverage solution 26 is one that requires dilution with a diluting liquid, such as water, as in FIG. 1C. The diluting liquid may be initially frozen, such as ice, and melt to liquid form. Brewing basket 16 is carried in a basket holder 20, in a conventional manner and a lid 22 covers the basket holder. The brewing basket 16 may be removable or integrally formed with the basket holder 20. Additionally, the basket holder 20 may also be removable or integrally formed with the brewing machine 10. Also, the brewing basket 16 may comprise a standard single compartment type, a brewing basket with multiple compartments (as in FIG. 16), or multiple separate single compartment funnels/baskets combined to form a single brewing basket. Each of these types of brewing baskets 16 include at least one basket outlet 18 through which a liquid solution, containing one or both beverage material 32 and sweetener 34, may flow.

Above the brewing basket is a hot water dispenser 28 for delivering hot water into the basket. Lid 14 includes an inlet opening 24 through which the concentrated beverage solution enters into the container 12. A main aspect of the invention is a beverage brewing product, designated generally as A, which is placed in the brewing basket 16 before brewing. The brewing basket 16 may be a circular cup basket, square, or a funnel basket and may comprise more than one piece designed to contain one or more portions of the beverage brewing product A. Further, the brewing basket 16 may be open or closed. In an additional embodiment, the beverage brewing product A, may be sealed into the brewing basket 16 before brewing. It should be understood that while the preferred method of brewing sweet tea beverages, or dissolving concentrated powders to produce sweetened beverages, includes using hot water, these processes may also use water of any temperature, including cold, ambient, or lukewarm water.

Figure 2:
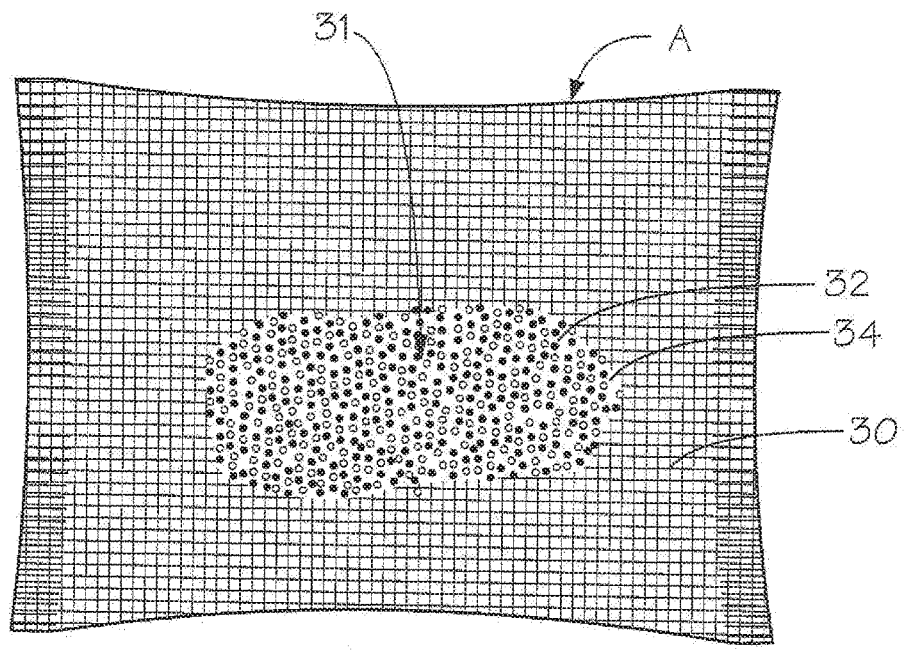
FIG. 2 is a top plan view illustrating one embodiment of a product for use in brewing a beverage containing a blend of beverage material and granulated sweetener retained in specified blend ratios contained in a water permeable mesh pouch.
Figure 3:
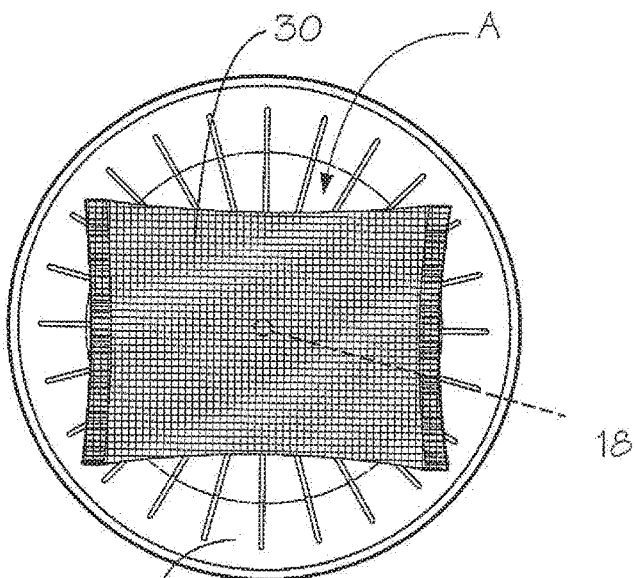
FIG. 3 is a top plan view of one embodiment of a beverage brewing product placed inside a brewing basket according to such embodiment the present invention.

As can best be seen in FIGS. 2 and 3, a beverage brewing product A is illustrated which contains a prescribed blend 31 of beverage material 32 and granulated sweetener particles 34 blended according to the present invention. Product A includes a pouch 30 in which a blend of beverage material 32 and granulated sweetener particles 34 are contained. The beverage material 32 preferably includes tea particles. However, the beverage material 32 may also include coffee grounds or a flavored concentrate. A flavored concentrate is a compound of one or more flavoring agents. Flavored concentrate may be granular, powdered, liquid, or gelatinous. A flavored concentrate may also be natural or artificial. Further, examples of concentrate flavors may include, but are not limited to, lemonade, pink lemonade, limeade, cherryade, orangeade, peach, mango, raspberry, cranberry, blackberry, fruit punch, vanilla, hazelnut, caramel, amaretto, cream, apple, cinnamon, chocolate, milk, tea, coffee, or any other desired flavor or combination thereof. Additionally, the beverage material 32 may also include a mix of coffee or tea and a flavored concentrate, where the concentrate flavor is selected to accentuate the coffee or tea as desired. The granulated sweetener 34 may include granules of sugar or sweetener formed from agave, coconut, honey, maple syrup, molasses, stevia, sugar alcohols, or other like element. Particles of granulated sweetener may comprise a single sugar granule or multiple agglomerated granules.

Pouch 30 is preferably made from a mesh polymer material having a predetermined mesh size to retain the blend while allowing the flavoring from the beverage material to be extracted and the granulated sweetener particles to dissolve in the brewing basket. However, pouch 30 may also be made of any food grade sieve material, including cotton, cellulose, or even metal. It is important to note that in previous brewing methods, such as brewing tea, sugar is added to the beverage solution after it is brewed and has been cooled. Thus, the sweetener utilized to sweeten the beverage is dissolved in a cool beverage solution, reducing its ability to be dissolved.

FIG. 2 shows mesh pouch 30 cut away to show the beverage material and sweetener blend 31 (beverage material 32 and granulated sweetener particles 34) contained in the pouch. FIG. 3 shows the beverage brewing pouch A placed in brewing basket 16 of the brewing machine. As the hot water fills the filter basket, pouch 30 generally becomes submerged in hot water 29 as in FIG. 1B. The steeping of the beverage material 32 and granulated sweetener 34 extracts the flavor from the beverage material 32 and dissolves the particles of sweetener 34 producing a sweetened beverage solution 26 dispensed through the basket outlet 18 into container 12 through container lid opening 24. Because the sweetener 34, such as sugar, is steeped in hot water, more of the sweetener 34 is dissolved quickly than when sweetener is added to the beverage solution after brewing in the urn. Beverage brewing product A may also be steeped in 2 cups of water in a container to make a concentrated or non-concentrated beverage solution. If concentrated, a proportioned amount of diluting liquid, such as two cups of water or equivalent amount of ice, are added to the solution to create the beverage solution. Either way, the Brix of the solution is consistent since the same blend of beverage materials and granulated sweetener is known.

Pouch 30 is preferably constructed from any suitable FDA approved polymeric material such as nylon, polyester, polypropylene, polyethylene, or cellulose in a woven or nonwoven material, and preferably is 4"×4" to 6"×6" in size. However, pouch 30 may also be made of any food grade sieve material, even metal. In some applications, it may also be possible to utilize a cotton nonwoven or woven fabric. The term mesh is meant to include a fabric or material having defined regular openings such as in a woven material, screen, etc., or random openings such as found in a nonwoven material like a thin web of fibrous materials, scrim, etc. which may provide the same permeability. For example, a non-woven fibrous web with a polyester/polypropylene blend may be used.

With regard to sugar as a granulated sweetener, sugar refiners run sugar through a series of sieves rated with a US mesh number. The granules of a certain size get caught or retained in the sieve with smaller holes than the size of the granule. This is done in order to provide uniform size granules to the market. Typically, the sugar found in grocery stores and restaurants are of a small granule particle size and are retained in a mesh sieve the size of 45-120. The smaller the mesh number, the larger the granules of sugar are, and the larger the mesh number, the smaller the granules of sugar are. For example, a sugar granule of mesh sieve size 3 would be larger in size than a sugar granule of mesh sieve size 35. This sizing standard is relevant to all granulated sweeteners. It has been found, according to the present invention, that an advantageous size of particles of sweetener, particularly sugar, is that retained by US sieve numbers 3-35, although granule sizes larger than 3 will work as well. Therefore, a typical sweetener, like sugar granules, found in stores and restaurants, at a mesh sieve size of 45-120, is smaller than the size preferable for use in the present invention.

Referring now to FIG. 4, an alternate embodiment of the invention is illustrated for a beverage brewing product B wherein the beverage material 32 and granulated sweetener particles 34, are contained in separate compartments 36 and 38 of pouch 30'. Each compartment is formed from a mesh material as disclosed for product A, shown in FIGS. 1 through 3. In addition, the two compartment pouch includes a seal 40 around the pouch and a seal 41 dividing the pouch into compartments 36 and 38 and providing a fold line. Thereby, as shown in FIGS. 5 and 6, one compartment of the product B may be folded over onto the other compartment during brewing in a brewing basket 16.

FIG. 7 illustrates another embodiment of the invention C wherein the beverage material 32 is contained in one pouch 42 having a seam 44 around its edges, and the granulated sweetener particles 34 are contained in a separate pouch 46 also having a seam 48 around its edges. Compartments 42 and 46 are sealed in any suitable way, including the four-sided seal of FIG. 4. In 30", one compartment may be placed on top of the other during brewing in much the same manner as with the folded tea sweetening brewing product B, as shown in FIGS. 5 and 6. In addition, the brewing basket 16 may be constructed so that each of the pouches 42, 46 are contained in a separate space therein and water passes through each in serial order. For example, the brewing basket 16 may have a first piece through which water may pass that contains one pouch and which is stackable upon a second piece through which water may pass that contains the other separate pouch.

Figure 8:
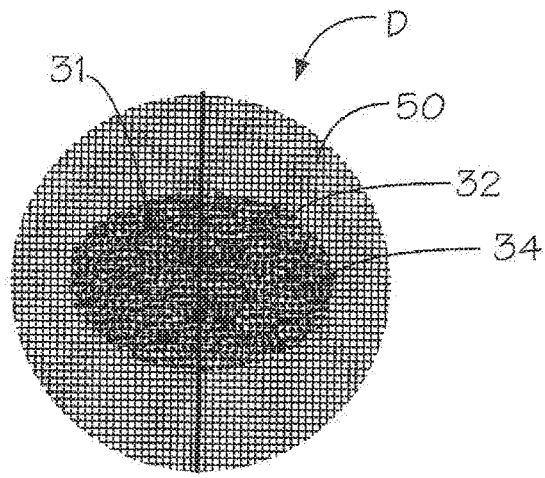
FIG. 8 is a top plan view illustrating another embodiment of a beverage brewing product including an open filter which contains a blend of beverage material and sweetener.
Figure 9:
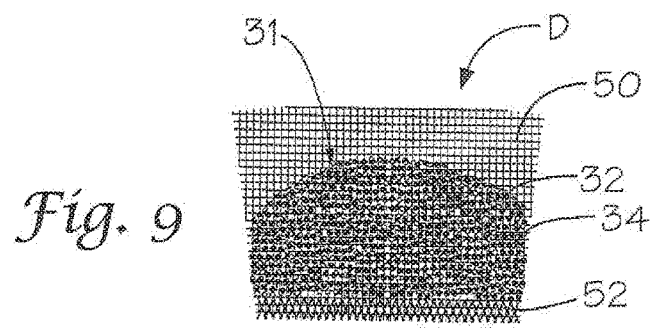
FIG. 9 is a side cut away illustrating one embodiment of a beverage brewing product including an open filter with a seal along the bottom edge containing a blend of beverage material and sweetener.
Figure 10:
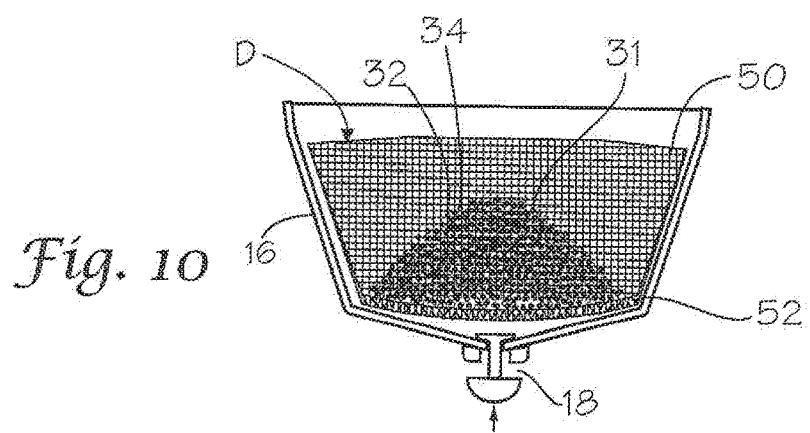
FIG. 10 is a side cut away illustrating one embodiment of a beverage brewing product including an open filter containing a blend of beverage material and sweetener placed in a brewing basket.

Referring now to FIGS. 8-10, an alternate embodiment of the invention is illustrated for a beverage brewing product D wherein the sieve is an open filter 50 having a seam 52. Alternatively, the open filter 50 may also be formed without a seam. The filter 50 in FIGS. 8-10 is a funnel shape, however it may be any shape. For instance filter 50 may be a cup or bowl shape. The filter 50 is formed from a mesh material disclosed for product A. The blend 31 of beverage material 32 and granulated sweetener particles 34 is added to the filter. As seen in FIG. 10, the filter 50 containing the blend 31 of product D may be placed within a brewing basket 16 to be utilized for an open filter brewing process.

Figure 11:
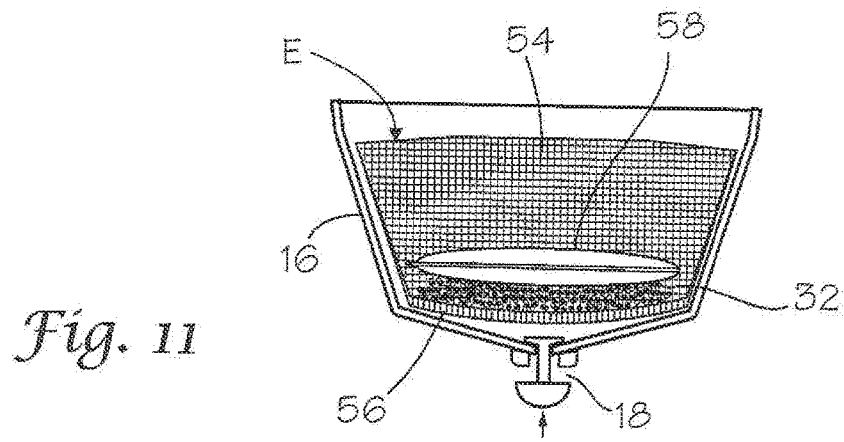
FIG. 11 is a side cut away illustrating one embodiment of a beverage brewing product including an open filter containing beverage material and pouch containing sweetener placed in a brewing basket so that the pouch sits atop the open filter during brewing.
Figure 12:
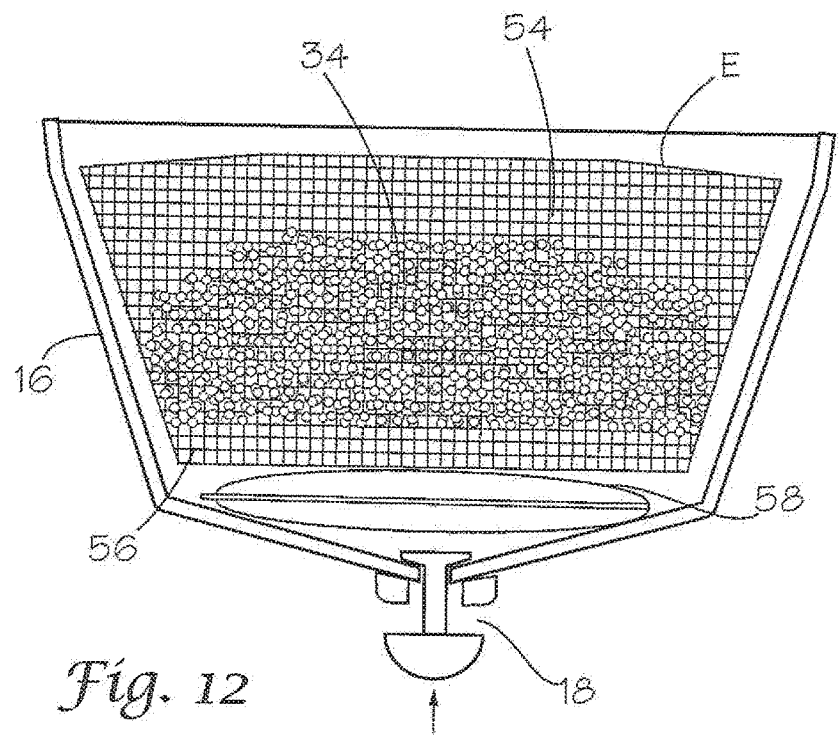
FIG. 12 is a side cut away illustrating one embodiment of a beverage brewing product including an open filter containing sweetener and pouch containing beverage material placed in a brewing basket so that the open filter sits atop the pouch during brewing.

Referring now to FIG. 11, an alternate embodiment of the invention is illustrated for a beverage brewing product E wherein the sieve comprises an open filter 54 containing the beverage material 32 and a pouch 58 containing the granulated sweetener separately. The filter 54, similar to that of product D, also has one seam 56, although it may have no seams or more than one. Alternatively, the filter 54 may contain the granulated sweetener particles 34, while the pouch 58 contains the beverage material 32, as in FIG. 12. The pouch 58 may be disposed either on top of the filter 54 in the brewing basket 16, as in FIG. 11, underneath the filter 54, as in FIG. 12, or aside the filter 54. The filter 54 and pouch 58 of product E are formed from a mesh material disclosed for product A. In certain embodiments, the filter 54 and the pouch 58 may also be integrally formed or affixed together.

Figure 13:
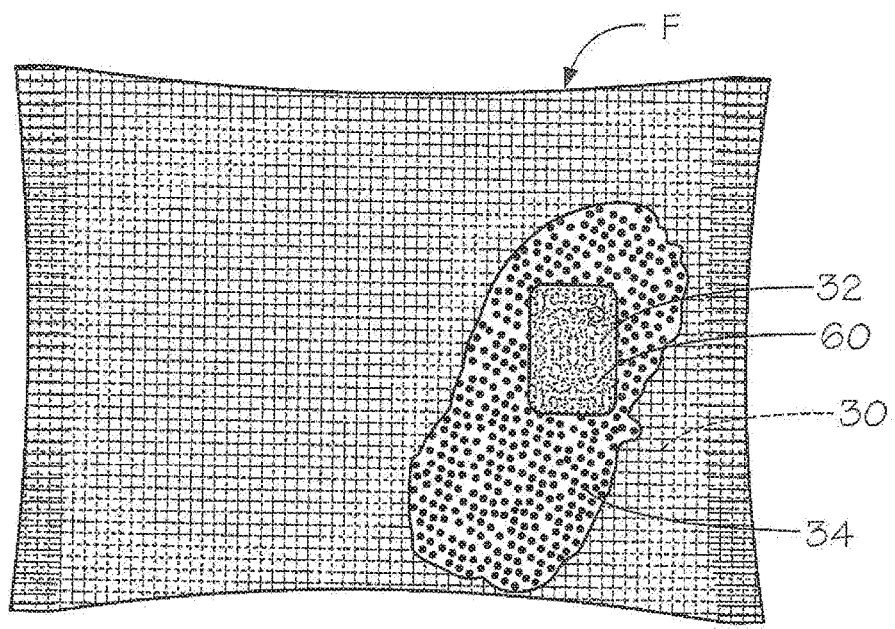
FIG. 13 is a top plan view illustrating one embodiment of a beverage brewing product including a dissolvable film packet.

Referring now to FIG. 13, an alternate embodiment of the invention is illustrated for a beverage brewing product F wherein a pouch 30 contains a granulated sweetener 34 and a dissolvable film packet 60 with a beverage material 32 therein. The dissolvable film packet 60 is formed from a food grade material which dissolves upon contact with water, such as by steeping. An example of one such film that could be utilized includes that identified as Vivos® Films produced by MonoSol, LLC. Once the packet 60 dissolves due to contact with water, the beverage material 32 is released to flavor water in the brewing basket 16. Alternatively, the beverage material 32 and granulated sweetener 34 may be disposed in an opposite fashion to that shown in FIG. 13 or both may be disposed within the packet 60 inside of the pouch 30. In addition, when packet 60 is disposed within pouch 30, as illustrated in FIG. 13, the product F may be utilized in a container directly, such as a pitcher, pot, urn, or cup. Furthermore, packet 60 may be placed into an open filter—like 50 and 54 of products D and E—instead of being contained within a pouch 30. For example, packet 60 may replace pouch 58 in FIG. 11. In an additional embodiment, the packet 60 may be placed in the brewing basket 16 separate from a sieve—30, 50, and 54—instead of being located within. For example, the packet 60 may replace pouch 58 in FIG. 12. Use of a packet 60 has the benefit of allowing use of liquid and gelatinous beverage materials, such as liquid tea, coffee, or citrus flavored concentrates, which might not otherwise be useful in the present invention. Further, use of a packet 60 has the benefit of preventing air from reaching one or both of the beverage material and granulated sweetener, lowering the likelihood of spoliation thereof.

Regarding products A, B, C, D, E, and F, product A is considered advantageous because larger particles of sweetener, such as sugar, are mixed in with the smaller particles of beverage materials, such as tea, making the sweetener dissolve faster and more fully. In addition, the beverage flavor is extracted more fully in the blend because the granules reduce the compacting of the beverage materials.

Larger granule sweetener particles allow hot water to flow around and contact the particles at the same time as the flavor is being extracted out of the beverage materials. Thereby, two steps have been reduced to one. In the prior method, the sugar goes in after the tea has cooled in a two-step process.

In accordance with the invention, a method for brewing a sweetened beverage is disclosed comprising the steps of providing a brewing machine having a container 12, a brewing basket 16 carried above the container 12, and a hot water dispenser 28 for delivering hot water into the brewing basket 16. Next, the method includes placing a mesh pouch 30, 58; open filter 50, 54; and/or a dissolvable film packet 60 containing beverage material 32 and granulated sweetener 34 into the brewing basket 16, and dispensing hot water into the brewing basket 16 to steep the beverage material 32 and granulated sweetener 34 and produce a flow of sweetened beverage solution 26 out of the basket 16 into the container 12. In an alternative embodiment involving beverage material 32 which dissolves in water, a dissolvable film packet 60 containing both beverage material 32 and granulated sweetener 34 can be placed into a container 12—such as a pitcher, pot, urn, or cup—before or after water is added thereto to produce a sweetened beverage solution 26 in the container 12.

If concentrated, the beverage solution 26 is added to a proportioned amount of diluting liquid, like water, at a time after the sweetener 34 has been more completely and consistently dissolved—as in FIG. 1c—in contrast to the sweetener 34 being dissolved in the beverage solution after brewing. When performing an open brew process, it is preferable to store any loose tea/coffee and sugar mixture in storage bags or pouches constructed from metallized polypropylene or metallized polyethylene, whereby the loose tea or coffee grounds and sugar mixture may be poured from the metallized bag into an open filter 50.

Figure 14:
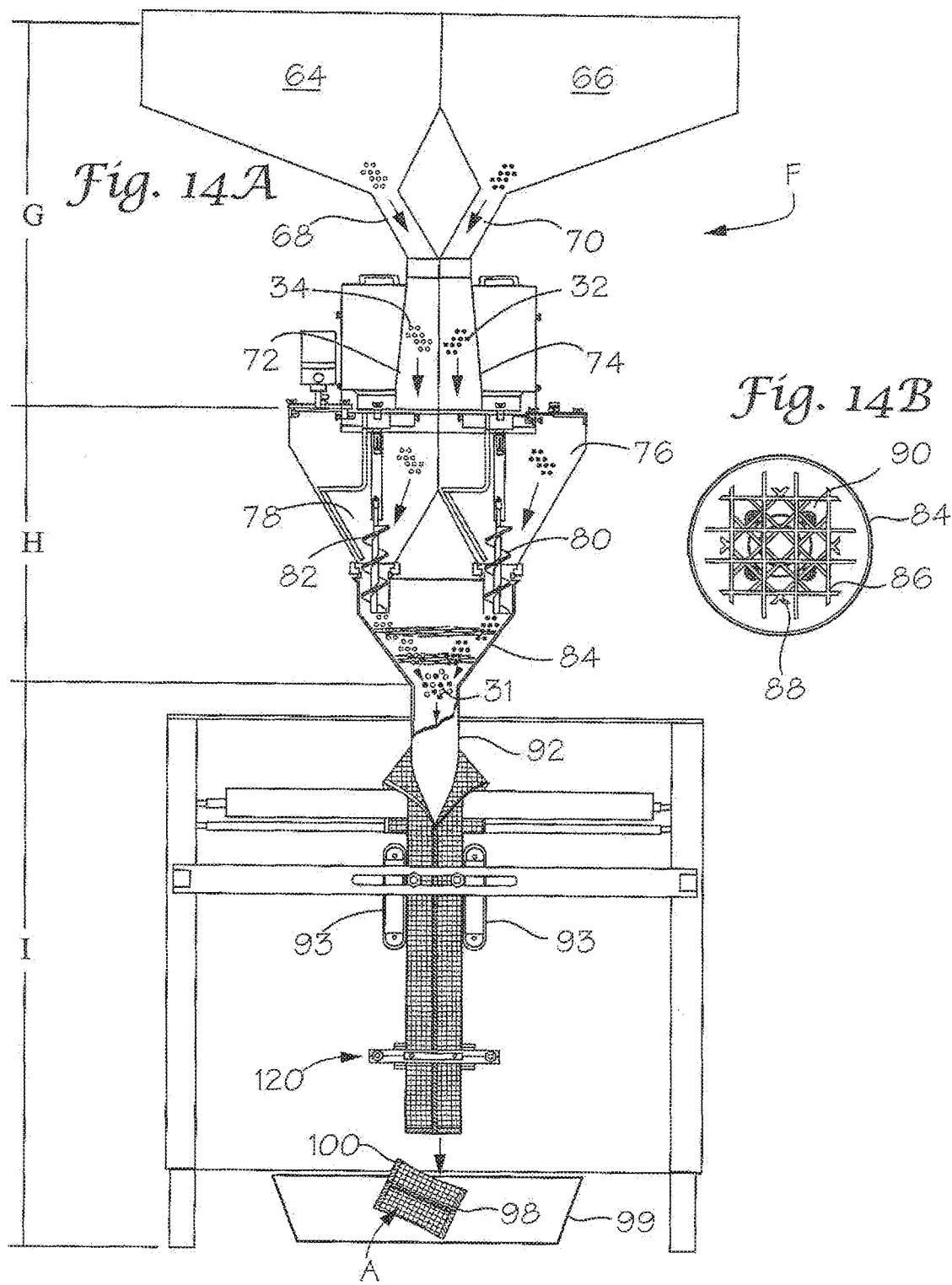
FIG. 14A illustrates a beverage material and sweetener blending apparatus for apportioning and blending a beverage material and sweetener, and packaging the blend in a water permeable pouch.
FIG. 14B is a top plan view of a blending/dispensing funnel according to one embodiment of the present invention.
Figure 15:
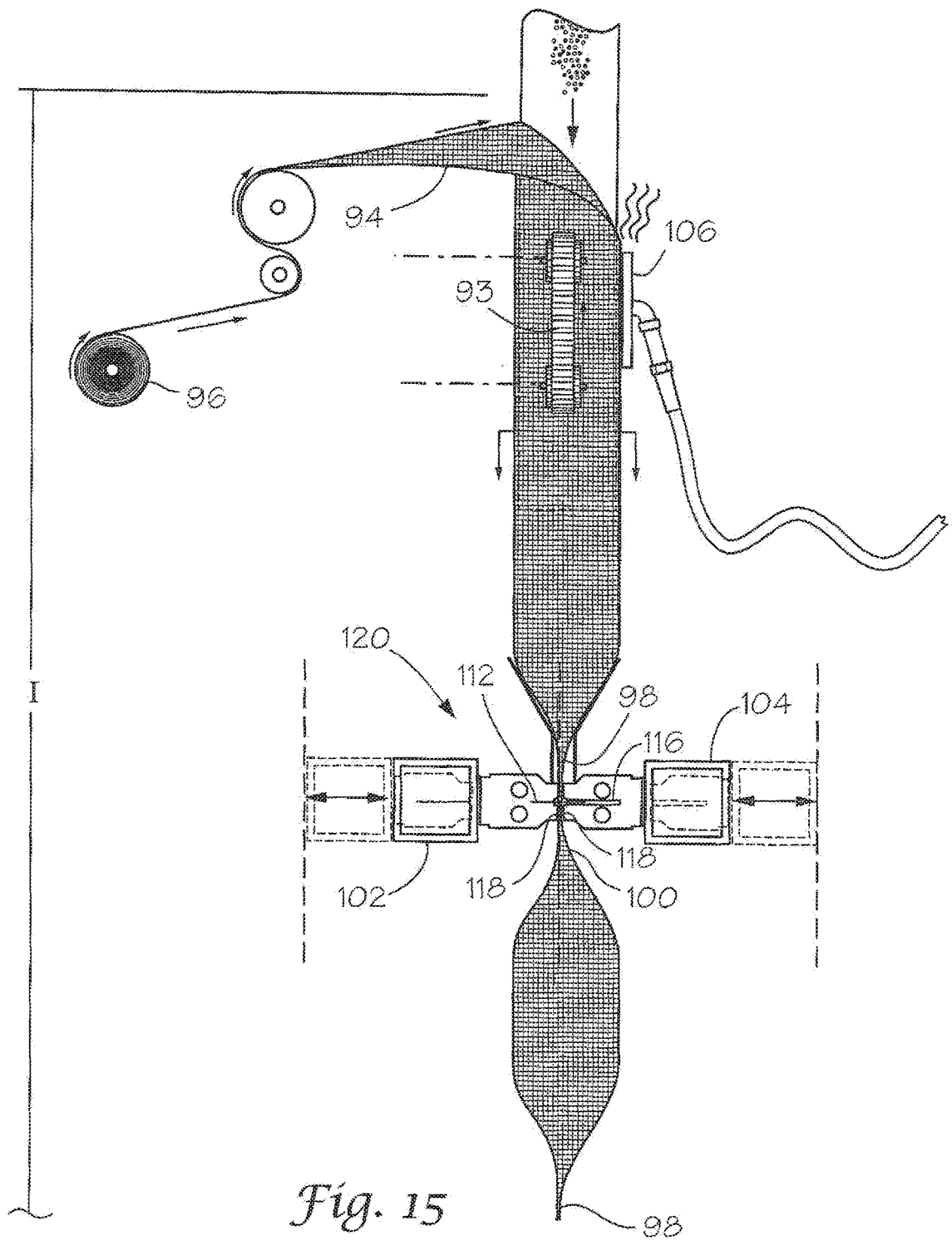
FIG. 15 is a side elevation illustrating a filling, sealing and cutting section for dispensing a blend of beverage material and granulated sweetener into a mesh pouch, and sealing and cutting the top end after the pouch is filled.

Referring now to FIGS. 14A, 14B and 15, a system and method for producing the beverage brewing product A in pouch 30 will now be disclosed in more detail, along with the process for blending the beverage material and sweetener, and packaging. As can best be seen in FIG. 14A, a blending apparatus, generally designated G, for feeding and blending beverage material 32 and sweetener 34 is illustrated. Apparatus G includes a feeding section H having a separate beverage material bin 66, and a separate sweetener bin 64 which separately deliver beverage material 32 and granulated sweetener 34 through conduits 68 and 70 through separate infeed ducts 72, 74, respectively. From the infeed ducts, beverage material 32 is delivered to a hopper 76 and sweetener 34 is delivered to a separate hopper 78 of blending section I. A feed auger 80 is located in hopper 76, and a feed auger 82 is located in hopper 78. The augers meter or control the amounts of the beverage material and granulated sweetener being delivered by controlling the auger speeds, and hence the blend ratio. The preferred beverage material/sweetener blend depends upon the chosen beverage material and sweetener. For flavored concentrate and sugar, the ratio is within about 1:3 to 1:80. For tea particles and sugar, the ratio is within about 1:3 to 1:35, and preferably within 1:5 to 1:25, depending on the customer, with 1:12 being typical. Additionally, the size of the tea particles varies with the customer's tea blend. Tea is widely available, for example, Henry P. Thomson Tea Company in Peapack, N.J., is a source and the specifications are for black, oolong, and green (including white tea). Generally, for most tea blends, 98% of the tea particles will be retained by a U.S. mesh sieve size of 80.

The portions of beverage material 32 and granulated sweetener 34 are fed into a blending and dispensing funnel 84 where the beverage materials and granulated sweetener are blended and dispensed through a nozzle 86. As can best be seen in FIG. 14B, the blending and dispensing funnel 84 may include any arrangement or device for spreading and blending the beverage material and granulated sweetener. In the illustrated embodiment, funnel 84 includes a plurality of layers of wire grates 86 and 88 angularly oriented at angles with each other to provide irregular grate openings 90 for the blend delivered through the funnel. Funnel 84 includes a bottom opening through which the blend 31 is delivered to a conduit or nozzle 92. Packaging section J includes a tubular roll of mesh material 94 being fed downwardly, which may be either tubular or flat mesh material delivering from roll 96 to be seamed tubular. As the stock mesh material is drawn downwardly over nozzle 92, by roller conveyors 93, a side heating bar 106 seals the edges of the mesh material together. As in a typical vertical form, fill and seal machine, a pair of moveable heating and cutting units 102, 104 are provided. Each unit includes heated sealing bars 118 above and below the respective knife blade 112 and knife slot 116. Sealing and cutting unit 104 includes knife blade 112, and sealing and cutting unit 102 includes knife slot 116 which receives the knife blade when the heat bars of the units are pressed together for sealing and the seam is then cut. Knife 112 extends into knife slot 116 of unit 104 to cut midway through the seam forming a top seam 100 for the pouch below and a bottom seam 98 for the pouch above.

As can best be seen in FIG. 15, tubular mesh material is initially sealed across the lower bottom end at 98 by the previous seal and cut operation, leaving the mouth open whereupon the blend 31 goes down through nozzle 92 into pouch 30. The pouch is dropped into a bin 99 and conveyed away. The next material is delivered to the sealing/cutting station 120 and its lower end sealed at 98 by the previous seal and cut operation and with its mouth open. The next pouch at sealing/cutting station 120 is then filled and sealed across the top whereupon the next bottom seal 98 is formed at the same time. Horizontal form, fill, and seal machines can equally be used to produce product A, B, C, D, and E.

Thus, it can be seen that an advantageous product and process can be had according to the present invention for brewing a beverage and dissolving a sweetener together in a brewing basket. A sweetened beverage solution flows out of the brewing basket into the urn which, if concentrated is mixed with a diluting liquid, like water, for consistently brewing a beverage. Preferably, at least one pouch, in the form of a fine polymeric mesh pouch, retains the beverage material and sweetener during brewing. The sweetener dissolves rapidly and more fully in the present invention when the granular size of the sweetener is generally U.S. Mesh sieve 35 or larger (i.e. lower mesh numbers) as opposed to when the granular size of the sweetener is generally smaller than U.S. Mesh sieve 35 (i.e. mesh sieve numbers above 35). The beverage material and the sweetener blended in the mesh pouch brew and sweeten the tea at the same time. The hot water entering the brew basket brews the beverage, dissolves the sweetener, and sweetens the beverage. The temperature of the water is one of the key factors in brewing. Although any temperature water may be used, utilizing hot water in the brewing basket helps dissolve more of the sweetener quickly. Larger granulated sweetener allows the water to flow around and make contact with the sweetener at the same time it is extracting flavor from the beverage material in the blend. The steps of brewing a beverage in a pot or urn, and then adding sugar to the beverage is replaced by one step, brewing the beverage and sweetening at the same time before they reach the urn.

In one embodiment of the present invention, it is contemplated that granulated sugar in the range of U.S. mesh sieve nos. 3 to 35 may be manufactured, as it is currently difficult to find sugar in this size range that is commercially available in the United States in large quantities. One preferred method for manufacturing sugar granules (or agglomerations) in this size range includes agglomerating sugar that is commercially available (i.e. smaller in granule size) into larger agglomerated pieces—such as pellets or cubes—and then breaking the pieces into smaller formations—such as granules or chunks—within the specified size range.

For example, commercial pellet mills are commonly used to form pellets from materials made from smaller granules, including feed mill pellets, wood pellets, and the like. These pellet mills may also be used to manufacture sugar pellets from sugar that is already processed into smaller granules. For instance, California Pellet Mill manufactures and sells a number of different commercial pellet mills that may be used in the instant process. In such a process, small granulated sugar is fed into the pellet mill, and formed into larger pellets. These pellets may be used in the beverage producing processes described herein, either as produced in pellet form, or the pellets may be broken up into smaller chunks (but still larger chunks than the original granulated sugar that is fed into the mill), in order to generate sugar granules or chunks that fall within the desired sugar size range as described herein. A similar process and machinery may be utilized to generate other agglomerated sugar pieces, such as sugar cubes.

The pieces may then be fed into a lump breaking machine (or lump breaker) to reduce the size of the pieces, as desired. Lump breaker machines are commercially available, such as the Model RDC 1515-SS from Munson Machinery, and are commonly used for the deagglomeration of free or non-free flowing bulk materials such as salt, sugar, spices and resins. After the agglomerated sugar pieces have been fed through the lump breaker, the resulting sugar granules, or chunks, may then be used to sweeten various beverages in the processes described herein. In one embodiment, it is contemplated that the sugar pieces 34 may be utilized to produce a beverage solution 26 by being placed directly into a brew basket 16 with beverage material 32, such as tea. It is further foreseen that one of both of the sugar pieces 34 and beverage material 32 may also be contained within a water permeable sieve (such as 30, 50, 54, and 58) or dissolvable film packet 60 when placed into the brew basket 16 or container 12.

In one embodiment of the present invention, it is contemplated that the blend 31 of beverage material 32 and granulated sweetener particles 34 used herein may be agglomerated to form one or more composite products—containing both beverage material 32 and granulated sweetener particles 34—that provide more desirable physical properties and may be used in the processes described herein. These composite products, like the agglomerated sugar pieces, may include formations such as granules, chunks, tablets, briquettes, extrudates, pellets, bricks, compacts, or the like. Further these composite products may be formed with granulated sweetener 34 of any size to form composite products in the range of U.S. mesh sieve no. 35 or lower, whether formed of single granules or from manufactured chunks, cubes, or pellets thereof. Although there are several ways recognized to create composite products, one preferred method for use in the instant method includes tumble/growth agglomeration.

Tumble/growth agglomeration, sometimes referred to as wet agglomeration, involves the introduction of a liquid binding agent or water into a volume of initial particles, such as the blend 31, to create liquid bridges between such particles which leave solid bridges after drying, forming larger composite product formations, such as granules or chunks.

In tumble/growth agglomeration, the introduction of the liquid into the volume of initial particles may be performed in a variety of ways which impact properties of the agglomerated product. However, a preferred method of introducing liquid involves the use of a mixer to ensure even distribution of the liquid in the volume of initial particles. Mixer Agglomerators are commercially available, such as the Flex-O-Mix, Turbulizer®, and FlexTurbulizer® from Bepex International LLC, and are commonly used for wet agglomeration processes. Thereby, liquid, such as water, may be added to the blend 31 in a mixer to evenly distribute the moisture amongst the blend 31. However, several other methods exist which may also be utilized in tumble/growth agglomeration, including spraying a fluidized bed of initial particles or utilizing a wet granulator apparatus.

Further, once the prescribed amount of moisture has been added and distributed in tumble/growth agglomeration, the product is then dried to evaporate the liquid, leaving composite product formations with solid bridges between particles thereof. While there are many methods for drying composite products, it is preferred that the product be dried either in the mixer or in a separate fluidized bed or dryer to ensure sufficient removal of the liquid therefrom. Thereby, the blend 31 used in the present invention—such as in a sieve (like 30, 50, 54, 58), dissolvable film packet 60, or brewing basket 16 directly—may be composite granules including both beverage material 32 and sweetener particles 34. It is also foreseen that composite products may be utilized in any of the processes described herein.

Furthermore, in addition to tumble/growth agglomeration, it is also foreseen that composite product may also be formed by mixing beverage material 32 with sweetener 34, such as mixing lemonade or flavored concentrate with sugar, and this mix is then fed into a pellet mill to form pellets or other machinery to form cubes or other formations which can be placed in a brew basket 16, dissolvable film packet 60, or sieve (like 30, 50, 54, and 58). Thereby, these composite products may be utilized in any of the processes described herein.

Figure 16:
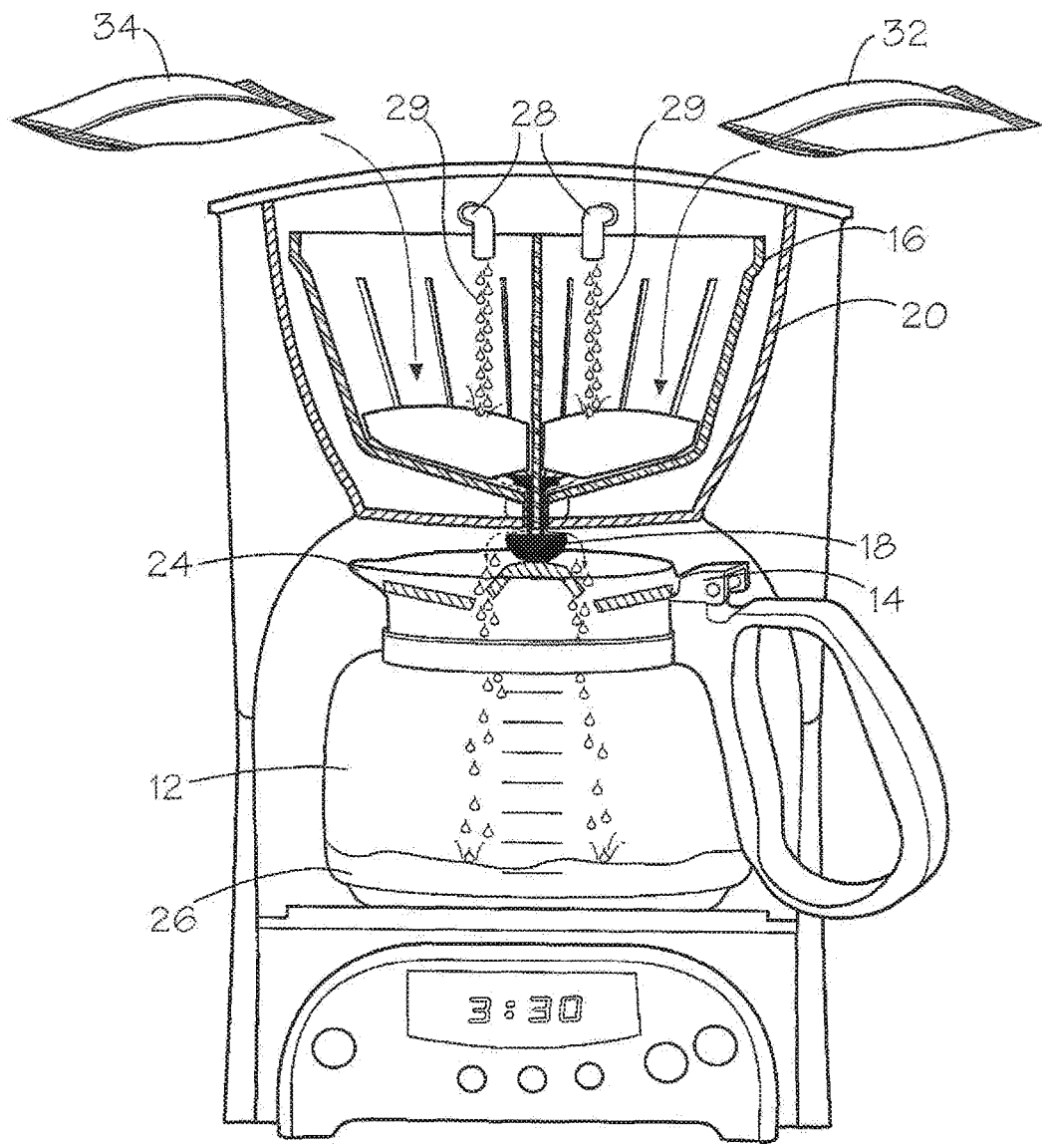
FIG. 16 is a front elevation view of a brewing machine with a multiple compartment brewing basket inserted and enclosed and with the basket holder and brewing basket cut away to show how beverage material and sweetener can be inserted and steep therein and be expelled to mix in a container.

In an additional embodiment, it is foreseen that the brewing basket 16 utilized in the described processes may comprise multiple brewing baskets or a brewing basket with multiple compartments, as in FIG. 16. Thereby, sugar and beverage material may be placed into separate compartments of said brewing basket 16 or into separate brewing baskets to steep separately and be dispensed into and combine within a container, such as an urn.

While a preferred embodiment of the invention has been described using specific terms, such description is for illustrative purposes only, and it is to be understood that changes and variations may be made without departing from the spirit or scope of the following claims.

What is claimed is:

1. A beverage product for producing a sweetened beverage comprising: at least one dissolvable film packet for placement in a container; beverage material and sugar disposed within said at least one packet; wherein said sugar granules have a size in the range of U.S. mesh sieve no. 35 or lower; and said packet comprising a food grade material which dissolves after contacting water in said container so that said beverage material and sugar contact said water and produce a sweetened beverage.

2. The beverage product set forth in claim 1, wherein said at least one packet is disposed within a water permeable sieve.

3. The beverage product set forth in claim 2, wherein said container comprises a brewing basket.

4. The beverage product set forth in claim 1, wherein said sugar includes agglomerated sugar pieces.

5. The beverage product set forth in claim 1, wherein said beverage material is selected from the group consisting of tea, coffee, and a flavored concentrate.

6. A beverage product for producing a sweetened beverage comprising: a water permeable sieve for placement in a container, wherein said sieve has openings generally smaller that the size of contents therein; a dissolved film packet for placement in said container; beverage material and sugar for placement in said container, wherein at least one of said beverage material and sugar is disposed within said sieve and at least one of said beverage material and sugar is disposed within said packet; wherein said sugar granules have a size in the range of U.S. mesh sieve no. 35 or lower; and said packet comprising a food grade material that dissolves after contact with water in said container so that said beverage material and sugar contact said water and produce a sweetened beverage in said container.

7. The beverage product set forth in claim 6, wherein said packet is disposed within said sieve.

8. The beverage product set forth in claim 6, wherein said sugar includes agglomerated sugar pieces.

9. The beverage product set forth in claim 6, wherein said container comprises a brewing basket.

10. The beverage product set forth in claim 6, wherein said beverage material is selected from the group consisting of tea, coffee, and a flavored concentrate.

11. A method for preparing a sweetened beverage comprising: providing a container; providing a water dispenser; providing at least one dissolvable film packet, wherein at least one of a beverage material and sugar is disposed within said packet; wherein said sugar granules have a size in the range of U.S. mesh sieve no. 35 or lower; placing said at least one packet into said container; placing said beverage material and sugar into said container; and dispensing water into said container to dissolve said packet and allow said beverage material and sugar to contact said water to produce a sweetened beverage solution.

12. The method for preparing a sweetened beverage set forth in claim 11, wherein said container comprises a brewing basket on a brewing machine.

13. The method for preparing a sweetened beverage set forth in claim 11, further including the steps of providing a water permeable sieve and placing said sieve into said container.

14. The method for preparing a sweetened beverage set forth in claim 13, wherein said sieve is selected from a group consisting of a mesh pouch and an open filter.

15. The method for preparing a sweetened beverage set forth in claim 11, wherein said sugar includes agglomerated sugar pieces.

16. The method for preparing a sweetened beverage set forth in claim 11, further including the step of diluting said sweetened beverage solution with diluting liquid.

17. The method for preparing a sweetened beverage set forth in claim 11, wherein said beverage material is selected from the group consisting of tea, coffee, and a flavored concentrate.

* * * * *